No. 875,588. PATENTED DEC. 31, 1907.
R. A. McKEE.
LUBRICATED COUPLING.
APPLICATION FILED SEPT. 14, 1906.
3 SHEETS—SHEET 1.
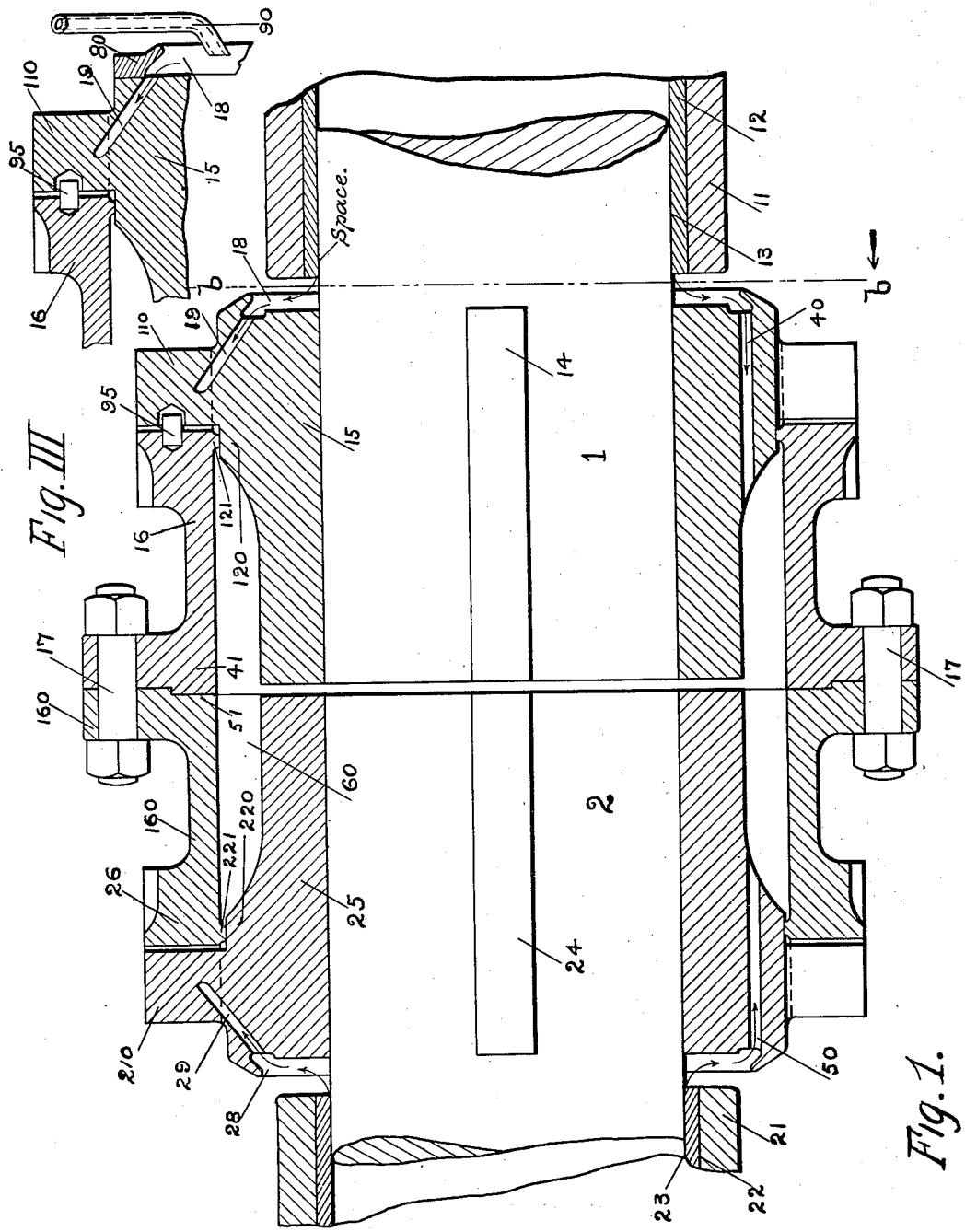

No. 875,588. PATENTED DEC. 31, 1907.
R. A. McKEE.
LUBRICATED COUPLING.
APPLICATION FILED SEPT. 14, 1906.
3 SHEETS—SHEET 2.
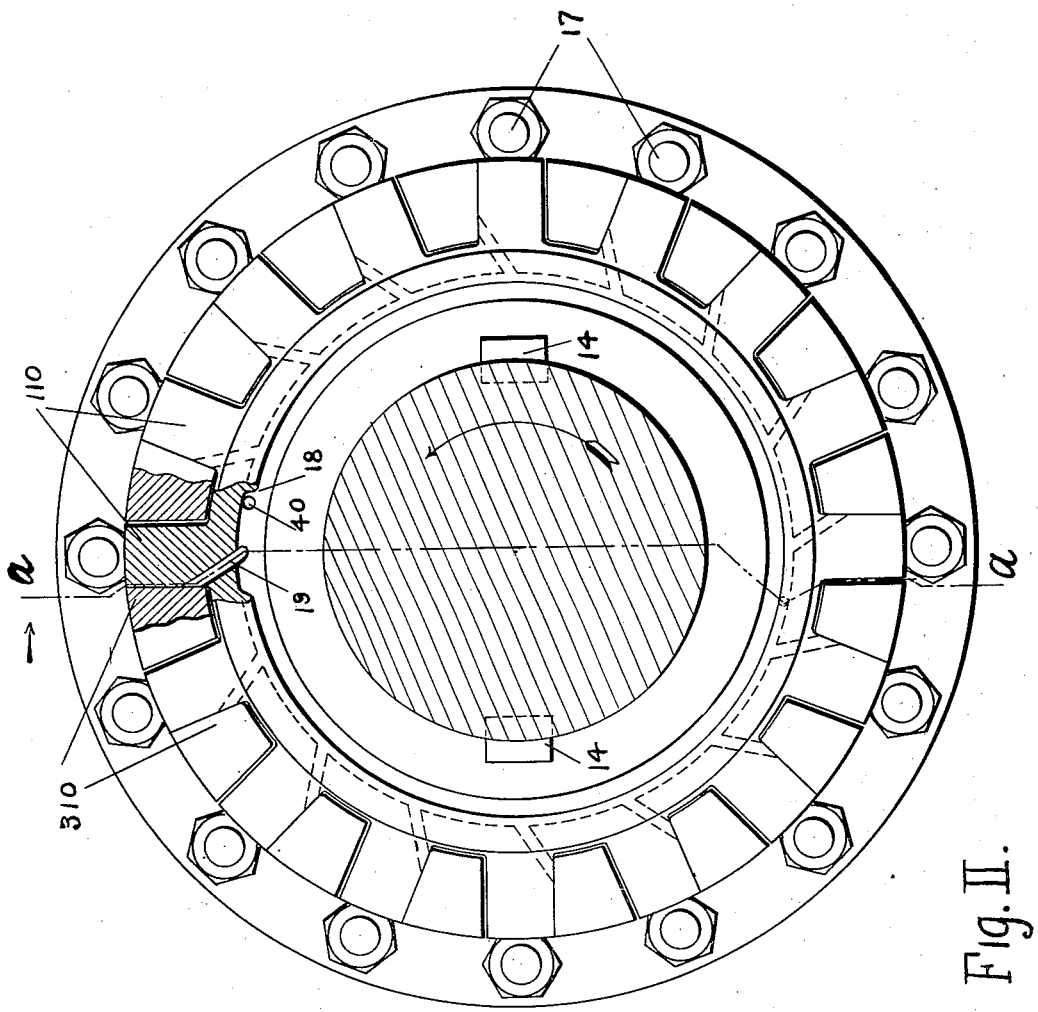
Fig. II.
WITNESSES:
Frank E. Dennett
Ella Brickell
R. A. McKee INVENTOR
BY
G. J. DeWein ATTORNEY.

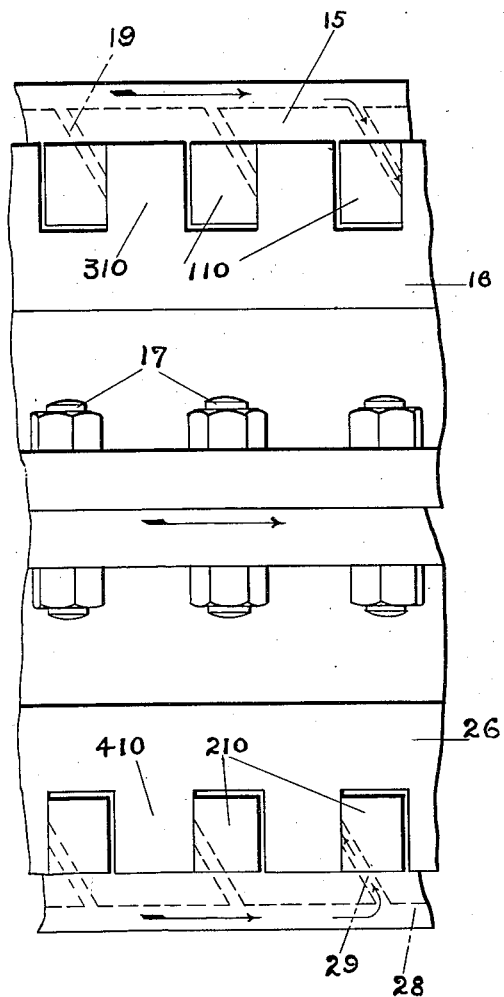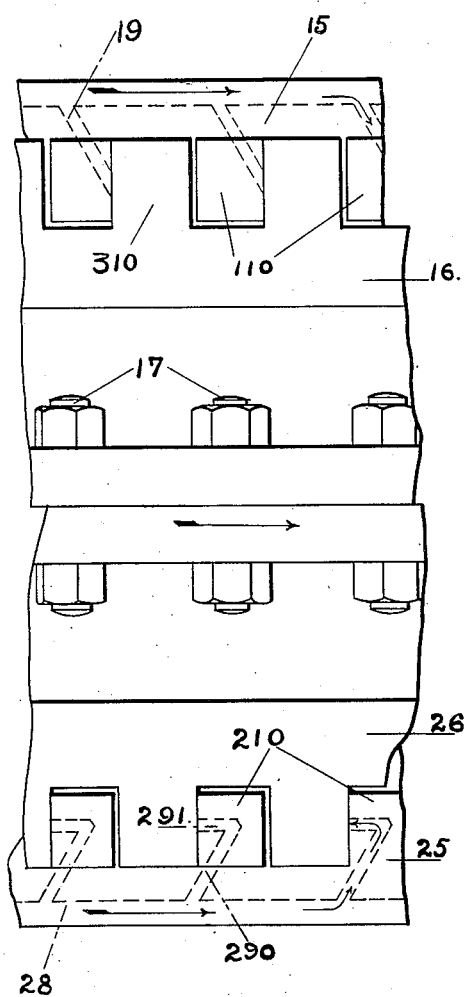

UNITED STATES PATENT OFFICE.

ROBERT A. McKEE, OF MILWAUKEE, WISCONSIN, ASSIGNOR TO ALLIS-CHALMERS COMPANY, OF MILWAUKEE, WISCONSIN, A CORPORATION OF NEW JERSEY.

LUBRICATED COUPLING.

No. 875,588.　　　　Specification of Letters Patent.　　　　Patented Dec. 31, 1907.

Application filed September 14, 1906. Serial No. 334,587.

*To all whom it may concern:*

Be it known that I, ROBERT A. MCKEE, a citizen of the United States, residing at Milwaukee, in the county of Milwaukee and State of Wisconsin, have invented a certain new and useful Lubricated Coupling, of which the following is a specification.

This invention relates to a lubricated coupling and is of special importance where two movable members, particularly rotatable members, are in contact but are free to move slidably with respect to each other.

Broadly stated, this invention comprises the combination of two rotatable members one of which is adapted to bear against and rotate the other, one of the members being so constructed and arranged that a lubricant is fed by centrifugal force between the surfaces in contact.

More specifically this invention relates to the combination with two rotatable members provided with teeth of a coupling member provided with teeth adapted to engage the teeth of the rotatable members, the structure being such that a lubricant is fed by centrifugal force between the contacting faces of the teeth.

In the accompanying drawings which illustrate an embodiment of this invention and on which the same reference characters are used to designate the same element in each of the several views,—Figure 1 is a vertical section of two rotatable members and a coupling member embodying my invention taken on the line *a—a* of Fig. 2. Fig. 2 is an elevation partly in section of the coupling device and associated parts, the view being taken on the line *b—b* of Fig. 1. Fig. 3 is a detail in section of a modification. Fig. 4 is a plan view of a part of the rotatable members and coupling device as shown by Figs. 1 and 2. Fig. 5 is a plan view similar to Fig. 4, but showing a modification in the manner of forming the oil ducts.

In certain classes of machinery it is desirable to couple a driving with a driven member in such a manner that while there is a positive driving connection between the two, the connection is flexible so that there is a slight amount of play or give between the parts. This may be necessary because the two rotatable members are not originally placed exactly in alinement or because, on account of high rotative speeds, one or the other, or both, of the rotative members may be slightly displaced. In using steam turbines as the driving member for dynamos or other machinery, on account of the high speed of the turbine and the fact that it is almost impossible to exactly balance the rotative parts, the shaft of the turbine is allowed a slight play, more so in fact than would be allowed in machinery which is driven more slowly. In fact, it is quite common in turbine practice to allow considerable play between the shaft and the bearings, and, in order to lubricate these bearings, a forced feed of oil or equivalent lubricant is used and the shaft really rotates on a thin film of oil in its bearing. As some oil will under such conditions exude from the bearings, provision has been made by this invention to utilize this oil which exudes for lubricating the contacting teeth of the coupling and rotating members.

On the drawings the numeral 1 represents the driving shaft of a steam turbine, for example; 2 represents the driven shaft, as the shaft of a dynamo, for example; 11 represents the bearing of the driving shaft; 21 represents the bearing of the driven shaft; 12 represents the lining of the driving shaft bearing; 22 represents the lining of the driven shaft bearing; 13 represents the oil space between the driving shaft and its bearing lining; 23 represents the oil space between the driven shaft and its bearing lining.

The numeral 14 represents a key for the driving shaft; 24 a key for the driven shaft; 15 a member seated upon the end of the driving shaft, and 25 a member seated upon the end of the driven shaft.

The numeral 160 represents a coupling member which is shown as composed of two parts designated respectively as 16 and 26, which are united by the bolts 17.

The members 15 and 25 which are shown as formed separately from, but seated on, the shafts 1 and 2, may be formed integrally with said shafts, but for convenience in manufacturing and assembling the parts it is preferred that they be formed as separate members and connected with the shafts in any suitable way, as by a shrink fit or a forced fit, keys 14 and 24 affording additional security against any slip taking place as between these members and their respective shafts.

The member 15 is shown as provided with a series of teeth 110 on the exterior thereof, while the member 25 is shown as provided with a similar series of teeth 210. The members 16 and 26 of the coupling are shown as provided with corresponding teeth 310 and 410, respectively, adapted to engage with the beforementioned teeth on members 15 and 25.

In the preferred form of the invention as shown by Figs. 1, 2 and 4 of the drawings, the members 16 and 26 are duplicates each of the other with the exception that one of said members, as 15, is provided with a projection 41 which is adapted to be seated in a recess 51 formed in the other.

It will be observed from the structure shown that as the shaft 1 is rotated, the teeth 110 on the member 15 will engage with the teeth 310 on the member 16 which mesh therewith, thereby causing the rotation of the member 16 and the member 26 on account of the bolts 17 and the teeth 410 on the member 26 engaging the teeth 210 on the member 25 will cause the rotation of said last mentioned member and the shaft 2 to which it is secured.

The members 15 and 25 are each provided with a depression which, when the several parts are assembled, forms a space 60 between said members and the coupling member 160. The members 16 and 26 are also recessed interiorly, projections 121 and 221 respectively being left which are adapted to seat upon the shoulders 120 and 220 provided on the members 15 and 25.

With this form of coupling member and associated parts it is apparent that the driving shaft can positively actuate the driven shaft while at the same time there exists in the connection as a whole considerable flexibility so that the driven shaft is not affected by any slight difference of alinement which may exist between the two shafts arising either from the original setting of said shafts or on account of displacement due to rotation or other causes.

It is apparent that the teeth on the coupling member can move slightly with respect to the teeth on the members 15 and 25, and that the projections 121 and 221 can also move slightly with respect to the shoulders 120 and 220.

The purpose of the present invention is to afford means for lubricating the bearing surfaces of the teeth and the projections 121 and 221 and shoulders 120 and 220.

Advantage is taken of the fact that some lubricant will exude from the spaces between the shafts and their bearings and the members 15 and 25 are recessed to form receptacles 18 and 28 to catch such lubricant as it exudes and which may be thrown off by centrifugal force, and ducts 19 and 29 are provided leading from said receptacles 18 and 28 to the faces of the teeth 110 and 210 that normally contact with the teeth 310 and 410 respectively.

Ducts 40 and 50 are also provided affording communication between the receptacles 18 and 28 and space 60 through which lubricant will flow and thus reach projections 121 and 221 and shoulders 120 and 220.

After the coupling members and the coacting parts have been nicely fitted together, if it were necessary to dismantle the coupling, some inconvenience would be encountered in reassembling the parts in exactly the same relation which they occupied before they were dismantled. In order to expedite the reassembling of the several parts in the same relation that formerly existed, a dowel pin 95 may be secured to one of the parts so as to enter a recess formed in another of the parts. It has been deemed necessary to show only one dowel pin as it is obvious that the same expedient could be used with the members 25 and 26 and the members 16 and 26. Marks upon the exterior surfaces of the parts, or any similar devices for this purpose could be employed.

Fig. 3 shows a modification of the device as illustrated in Figs. 1, 2 and 4. In this modification the recess 18 is shown as formed by a separate piece 80 secured to the member 15. A pipe 90 is also shown by which a more copious supply of lubricant may be delivered to the recess 18.

Fig. 5 shows a modification of the method of forming the oil ducts in the member 25. The members 15 and 25 are ordinarily formed as duplicates each of the other, and either member could be used on the driving or the driven shaft. With this arrangement the ducts leading to the contacting faces of the teeth would be in the direction of the movement of the lubricant under the action of centrifugal force, as shown at the upper part of Fig. 4, or in the direction opposed to said flow, as shown by the lower part of Fig. 4.

In order that the flow of the lubricant shall be in the direction of its flow under the action of centrifugal force, the ducts are formed extending in the general direction of motion of the members and then turned backwardly so as to deliver the lubricant to the contacting face of the tooth. This may be effected by drilling inwardly and upwardly from the outer face of the member and then drilling in from the face of the tooth to intersect said duct.

What I claim is:

1. The combination with a rotatable member provided with a tooth, of a second member rotatable on substantially the same axis and provided with a tooth adapted to engage the tooth of said first mentioned member to rotate the same, one of said members being recessed inwardly towards its axis to form a lubricant receptacle and also being provided with a duct leading outwardly from said receptacle to the bearing surface of its tooth.

2. The combination with a rotatable member provided with a tooth, of a second rotatable member provided with a tooth adapted to engage the tooth of said first mentioned member to rotate the same, one of said members being recessed inwardly towards its axis to form a lubricant receptacle and also being provided with a duct leading outwardly from said receptacle to the bearing surface of its tooth, and a journal bearing for said last mentioned member, said journal bearing being nearer the axis than said lubricant receptacle.

3. The combination with two rotatable members each of which is provided with teeth of a coupling member provided with teeth engaged with the teeth of the two rotatable members, one of said rotatable members being recessed to form a lubricant receptacle and also being provided with ducts leading outwardly from said receptacle to the engaged faces of its teeth.

4. The combination with two rotatable members each of which is provided with teeth of a hollow coupling member provided with teeth engaged with the teeth of the two rotatable members, said coupling being provided on its interior with projections seated on said rotatable members, one of said rotatable members being recessed to form a lubricant receptacle and also being provided with ducts leading outwardly from said receptacle to the engaged faces of its teeth and also being provided with a duct to convey lubricant from said receptacle and discharge it within the hollow coupling.

5. The combination with two rotatable members each of which is provided with teeth, of a two-part coupling member, each of the parts of which is provided with teeth adapted to engage with the teeth of said two rotatable members, ducts being provided leading outwardly to the engaged faces of some of said teeth to feed lubricant outwardly by centrifugal force to said engaging teeth faces.

In testimony whereof I affix my signature in the presence of two witnesses.

ROBERT A. McKEE.

Witnesses:
G. F. DE WEIN,
FRANK E. DENNETT.